June 13, 1933.  J. C. FALKENBERG  1,913,628
METHOD OF LIQUEFYING CHLORINE
Filed Aug. 11, 1930
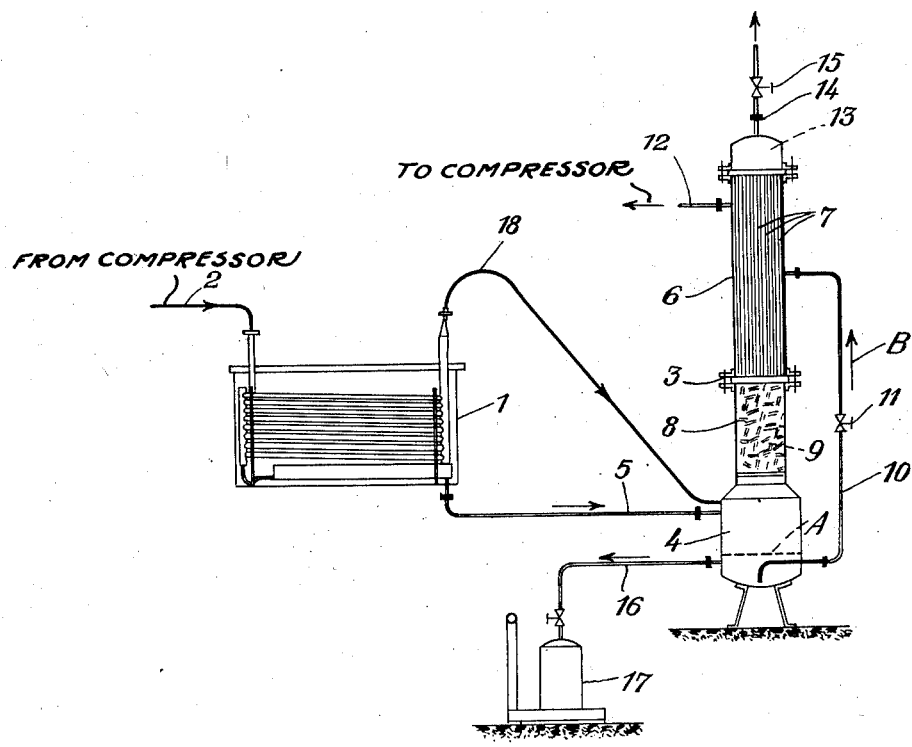

Patented June 13, 1933

1,913,628

UNITED STATES PATENT OFFICE

JOHAN CHRISTIAN FALKENBERG, OF PARIS, FRANCE

METHOD OF LIQUEFYING CHLORINE

Application filed August 11, 1930, Serial No. 474,637, and in Germany December 14, 1929.

As is well known, chlorine as produced by electrolysis must after compression be cooled in condensers for converting it into the liquid state. In this case the cooling was effected either by a refrigerating medium or by ordinary cold water. The chlorine was cooled down to a temperature which was of necessity several degrees, generally 5 to 10° C. higher than the temperature of the refrigerating medium. If the refrigerating medium had for instance a temperature of $-20°$ C., the chlorine could be cooled down to $-15°$ C. in the most favourable case. The chlorine was never completely liquefied, in other words a portion of the gas passed out of the liquefying apparatus again, mixed with foreign gases. The amount of the chlorine losses differed from one case to another. If a high compression pressure and very low temperatures were employed, the chlorine losses were lower than at a smaller degree of compression and higher temperature. If, for instance, a refrigerating medium of $-20°$ C. was available, the chlorine was cooled down to $-15°$ C. and compressed, for instance, to 3 kg/cm² above the atmospheric pressure. Under these conditions the loss of chlorine which passed away with the waste gases amounted to about 34%, if the gas mixture pumped into the condenser by the compressor had a purity of 90%. At the same time, a loss of 34% was the best result obtainable with a theoretically perfect chlorine liquefying apparatus.

By the method according to the invention it becomes possible either under the same working conditions as described above to reduce the chlorine loss or, if the same chlorine loss is tolerated, with the same compression of the chlorine gas to work at higher temperatures. The advantage thus offered consists either in this, that there are smaller chlorine losses in the waste gases and consequently a better yield from the liquefaction, or if the same amount of chlorine losses is to be tolerated, it is possible to operate with a much smaller refrigerating machine which, as it has to operate at temperatures which are not nearly so low, also consumes far less power than the low temperature refrigerating machine formerly required.

An arrangement for carrying out the method according to the invention is shown by way of example and diagrammatically in the accompanying drawing in elevation and partly in section.

In the drawing 1 is a condenser to which is fed a mixture of chlorine gas and other gases from any type of compressor, for instance, through a pipe 2 and at a suitable pressure, for instance, 3 kg/cm² above atmospheric pressure. Consequently the pressure in the interior of the condenser will also be 3 kg/cm². According to the invention this chlorine gas mixture is passed to a second condenser 3. This second condenser consists of a collecting vessel 4 for the liquid chlorine, into which the connection 5 between the first condenser and the second condenser suitably opens, and of a liquefying compartment, for instance a vessel 6 provided with suitable tubes 7.

According to the invention there is also provided between the vessel 4 and the liquefying compartment, a trickling or dripping arrangement, for instance a vessel 8 containing Raschig rings or the like 9. The lower part of the collecting vessel 4, in which the liquid level is indicated at A, is connected by a pipe 10 having a stop cock and throttle valve 11, with the interior of the vessel 6, while a further pipe 12 serves for conveying away chlorine gases, the latter pipe being led to the suction side of the chlorine compressor. In the vessel 6 there is also provided a space 13 for collecting the non-liquefied portions of the gas and from this space a pipe 14 with a throttle valve 15, leads away to the outside.

The liquid chlorine can be tapped off directly from the vessel 4 into transport vessels, as indicated at 16 and 17.

For special cases a connecting pipe may also be provided between the condenser and the vessel 4, as indicated at 18.

The method operates as follows:

The chlorine mixture flows through the pipe 5 out of the condenser 1 under a suitable pressure, for instance 3 kg/cm² and in this vessel separation takes place between the liquid chlorine and the gaseous constituent part of the mixture. Alternatively the liquid chlorine may be introduced into the vessel 4 separate from the waste gases. In this case the pipe 18 is used for the introduction of the waste gases. In the spaces 4, 8, 7 and 13, there is exactly the same pressure as in the condenser 1. This pressure is regulated by the regulating valve 15. The pressure is kept for instance at 3 kg/cm². The chlorine mixed with the other gases flows out of the space 4 through the space 8 and through the condenser tubes 7, into the space 13, leaving the apparatus through the valve 15.

At the same time liquid chlorine flows through the pipe 10 and the throttle valve 11 in the direction of the arrow 13 out of the vessel 4, into the vessel 6. The liquid chlorine which has been in the vessel 4, under a pressure of, for instance, 3 kg/cm², is expanded in the vessel 6 to atmospheric pressure. In the vessel 4 at a pressure of 3 kg/cm² the temperature will be +3° C. The temperature of the chlorine in the vessel 6 after the expansion to atmospheric pressure drops to −34° C. The chlorine which, as already state above, sweeps out of the vessel 4, through the vessel 8 and through the tubes 7, is further cooled down owing to the difference in temperature between +3° C. and −34° C., causing the greater part of the gaseous chlorine constituents to be condensed. The condensed chlorine trickles downwards in the tubes over the trickling members 9, into the space 8, meeting the rising chlorine gas and causing a precooling. The liquid chlorine which has become evaporated in the vessel 6 at a temperature −34° C., leaves this vessel at a temperature of approximately −30° to −34° C., through the pipe 12, that is to say in a relatively cold state. The gas leaving this vessel is pure chlorine gas without admixture of other gases. This gas is, therefore, in a particularly suitable state to be passed to the chlorine compressor where it can be used for producing an effective cooling of the cylinder shell of this compressor. Furthermore, by mixing this cold gas with the gas coming from the electrolysis, the temperature of the mixture is considerably reduced and the degree of concentration of the mixture increased so that the compressor will work in a particularly favourable manner.

What I claim is:

A method of liquefying chlorine from a mixture of chlorine and pure foreign gases by compressing and condensing, consisting in first preliminarily cooling the compressed chlorine gas mixture to a temperature which is sufficiently low for condensing a portion of the chlorine at the compression pressure employed, thereupon collecting the liquefied chlorine and tapping off the same into storage vessels, further cooling the remainder of the chlorine gas mixture by an expanding portion of the liquid chlorine obtained by the condensing, the remainder being thereby liquefied, collecting the liquefied portion of the remainder together with the liquid chlorine and returning the expanded chlorine into the gas mixture to be compressed again.

In testimony whereof I have signed my name to this specification.

J. C. FALKENBERG.